United States Patent [19]

Grögler et al.

[11] 4,330,656
[45] May 18, 1982

[54] ACTIVATED ISOCYANATE PREPOLYMERS AND A PROCESS FOR THE PRODUCTION OF ELASTOMERIC POLYURETHANE RESINS

[75] Inventors: Gerhard Grögler, Leverkusen; Wilhelm Kallert, Cologne, both of Fed. Rep. of Germany

[73] Assignee: Bayer Aktiengesellschaft, Leverkusen, Fed. Rep. of Germany

[21] Appl. No.: 81,982

[22] Filed: Oct. 4, 1979

[30] Foreign Application Priority Data

Oct. 6, 1978 [DE]  Fed. Rep. of Germany ....... 2843739

[51] Int. Cl.³ .................. C08G 18/32; C08G 18/76
[52] U.S. Cl. ...................................... 528/52; 528/74; 528/44
[58] Field of Search ................... 528/52, 74; 260/45.9 NC

[56] References Cited

U.S. PATENT DOCUMENTS

| | | | |
|---|---|---|---|
| 3,124,543 | 3/1964 | Fowler et al. | 260/2.5 |
| 3,243,389 | 3/1966 | Moeller et al. | 528/52 |
| 3,265,761 | 8/1966 | Havlik et al. | 528/64 |
| 3,663,506 | 5/1972 | Knopf et al. | 260/45.9 NC |
| 3,746,689 | 7/1973 | Narayan | 528/45 |
| 3,769,265 | 10/1973 | Groegler et al. | 528/74 |
| 3,795,638 | 3/1974 | Groegler | 260/45.9 R |
| 4,008,185 | 2/1977 | Olstowski | 528/52 |
| 4,094,827 | 6/1978 | McEntire | 528/53 |

FOREIGN PATENT DOCUMENTS

| | | |
|---|---|---|
| 831772 | 2/1952 | Fed. Rep. of Germany . |
| 1694249 | 3/1972 | Fed. Rep. of Germany . |
| 2504334 | 8/1976 | Fed. Rep. of Germany . |
| 1463809 | 2/1977 | United Kingdom . |

OTHER PUBLICATIONS

Saunders & Frisch–Polyurethanes, Part I, Interscience, N.Y. (1962) pp. 276–281.
Craven, "Reaction Rates of Isocyanates with Amines, ACS Symposium on Isocyanate Polymers, Sep. 1956, vol. 16, No. 3, p. 2 and Abstract.

*Primary Examiner*—H. S. Cockeram
*Attorney, Agent, or Firm*—Gene Harsh; Joseph C. Gil; Lyndanne M. Whalen

[57] ABSTRACT

This invention relates to isocyanate prepolymers activated with alkyl ureas and to a two-stage process for the production of polyurethane elastomers based on 1,5-naphthylene diisocyanate, using alkyl ureas as activators.

8 Claims, No Drawings

ACTIVATED ISOCYANATE PREPOLYMERS AND A PROCESS FOR THE PRODUCTION OF ELASTOMERIC POLYURETHANE RESINS

BACKGROUND OF THE INVENTION

The production of crosslinked, highly elastic synthetic resins by the reaction of substantially linear hydroxyl polyesters or hydroxyl polyethers with an excess of 1,5-naphthylene diisocyanate, followed by reaction with chain lengthening agents has long been known. In the first stage of this process, the polyester or polyether chains are linked via urethane groups. Substantially linear prepolymers which contain free isocyanate groups at the ends of the chains are obtained. The smaller the quantity of diisocyanate in excess of that required for a complete reaction with the hydroxyl groups present, the higher is the molecular weight of these prepolymers. The isocyanate prepolymers obtained in this way can be converted into high quality crosslinked polyurethane elastomers by two principal processes.

In one process described in German Patent Specification No. 831,772, the isocyanate prepolymers are reacted with slightly less than the equivalent quantity of glycols. The first reaction to take place is a chain lengthening of the prepolymers via urethane groups. In the second phase, the excess isocyanate groups react with the hydrogen atom of the urethane groups to form allophanate groups and thus cause crosslinking of the molecule.

The second principal process consists of a reaction of the isocyanate prepolymers with slightly less than the equivalent quantity of water or diamines. The prepolymers are chain lengthened via urea groups. The hydrogen atoms of the urea groups react in a second phase with excess isocyanate groups. This results in crosslinking, with the formation of biuret groups. Since biuret groups are thermally more stable than the allophanate groups formed in the first mentioned process, elastomers produced using water or diamines as the chain lengthening agent are superior in their mechanical properties, and in particular relative to their structural stability, elasticity, pressure deformation resistance and abrasion properties. In order to prevent the development of a cellular structure in the elastomer due to the liberation of carbon dioxide, which takes place when isocyanates react with water, the material may be molded under pressure.

When isocyanate prepolymers are crosslinked with glycols or water on a large commercial scale, it is absolutely necessary for the hot reaction mixtures to have both sufficiently long pouring times and short setting times (mold release times). The possibility of rapid removal of the elastomers from their molds is essential for achieving short operating cycles and hence optimizing the process economically. It is, therefore, generally necessary to accelerate the chain lengthening reaction in some manner.

It is known that the reaction between isocyanate groups and hydroxyl groups or water can be accelerated by various catalysts, such as tertiary amines, phenolates, alcoholates or organometallic compounds. However, all of the catalysts used in practice have serious disadvantages when used with 1,5-naphthylene diisocyanate. Due to the high melting point of 1,5-naphthylene diisocyanate (127° C.), relatively high operating temperatures (about 110° to 120° C.) must be used both during the preparation of the prepolymer and during the chain lengthening reaction. The usual polyurethane catalysts give rise at these temperatures to undesirable side reactions, such as trimerization of the isocyanate groups or excessive allophanatization or biuretization. The end products are, therefore, in many cases too highly crosslinked, with the result that they have poor mechanical properties, and in particular inadequate tear resistance. Furthermore, although these catalysts shorten the mold release time of the polyurethanes, the pouring time of the reaction mixtures is also drastically reduced. Due to the rapid increase in viscosity of the reaction mixture, controlled working up is no longer possible, especially in the case of large reaction batches. Moreover, adequate flow of the reaction mixture to fill every part of the mold can not be ensured, especially if the mold has a complicated shape.

At the high temperatures mentioned above, the tertiary amines and organic metal compounds most commonly used as accelerators in polyurethane chemistry accelerate the oxidation of the reactants by atmospheric oxygen. In addition, amines frequently produce troublesome discoloration and impart an unpleasant odor to the synthetic resin end product. Amines and organo-metallic compounds accelerate the saponification of those reactants which are capable of undergoing hydrolysis, so that these reactants, particularly the polyester polyols frequently used in practice, readily undergo hydrolytic degradation.

It has now surprisingly been found that N-alkyl ureas are excellent catalysts for the reaction of 1,5-naphthylene diisocyanate with polyols or for the chain lengthening reaction of prepolymers based on 1,5-naphthylene diisocyanate and do not have the disadvantages of the usual catalysts described above. The pouring time of the reaction mixtures is not sufficiently reduced by the N-alkyl ureas in spite of the high reaction temperature. The mold release time of the elastomers is substantially shortened. N-alkyl ureas do not impair the stability in storage of isocyanate prepolymers based on 1,5-naphthylene diisocyanate even at temperatures of about 100° C., in contrast to the usual catalysts which cause considerable trimerization and allophanatization during storage of the prepolymer.

N-alkylureas have already been described in British Pat. No. 1,463,809 as activators for the reaction of isocyanates with polyols. The isocyanates mentioned in this connection are tolylene diisocyanate and diphenylmethane diisocyanate. The process according to the invention differs in this respect in that it uses 1,5-naphthylene diisocyanates. It was found that N-alkyl ureas have a highly selective action for this isocyanate. When prepolymers based on 1,5-naphthylene diisocyanate are compared with prepolymers based on 4,4'-diisocyanatodiphenylmethane, each activated by the addition of N-methylurea, it is found that the reaction mixtures in the case of diisocyanatodiphenylmethane have insufficient pouring times for practical purposes and the mold release time is increased by a factor of about 2.5 (see Examples).

German Offenlegungsschrift No. 1,694,249 relates to the preparation of polyurethane foams based on polyether polyols, polyisocyanates, water and/or other blowing agents in which the foaming reaction takes place in the presence of open or cyclic esters of hexavalent sulphur. In this process, a wide variety of N-substituted ureas may be used as catalysts for the foaming reaction. The process according to the invention differs from this process, firstly in that the operating conditions employed according to the invention are such that substantially homogeneous elastomers are obtained; and secondly in the use of naphthylene diisocyanate as the isocyanate component; and lastly, in that, in the process according to the invention, no other catalysts are used.

DESCRIPTION OF THE INVENTION

This invention thus relates to a process for the production of polyurethane elastomers by the reaction of 1,5-naphthylene diisocyanate with a substantially linear, relatively high molecular weight polyhydroxyl compound to produce a prepolymer containing isocyanate groups, followed by a reaction with a chain lengthening agent in the presence of an activator, wherein the activator used is a compound corresponding to the general formula:

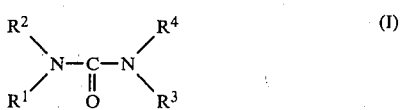
(I)

wherein $R^1$ represents an alkyl, cycloalkyl, aralkyl or aryl group with 1 to 15 carbon atoms, preferably an aryl group with 1 to 6 carbon atoms, and most preferably a methyl group, any of which groups may be substituted by a urea group corresponding to the formula:

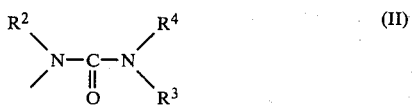
(II)

wherein $R^2$, $R^3$ and $R^4$ represent hydrogen, phenyl or a straight or branched chain alkyl group with 1 to 6 carbon atoms, preferably hydrogen, and wherein the conditions employed are such that substantially homogeneous elastomers are obtained.

The invention also relates to activated prepolymers with isocyanate end groups which are stable in storage, comprising (a) compounds corresponding to the following general formula:

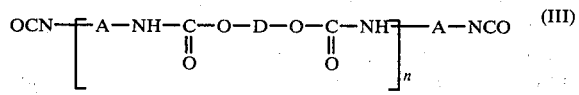
(III)

wherein A represents a group of the formula:

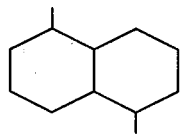

D represents a divalent group such as is obtained by removal of the hydroxyl groups from a glycol having a molecular weight of from 500 to 6,000 and n represents an integer from 1 to 5, preferably 1 or 2, and/or optionally (b) monomeric 1,5-naphthylene diisocyanate, and (c) from 0.001 to 1% by weight, preferably from 0.01 to 0.5% by weight, based on (a)+(b), of a compound corresponding to the general formula:

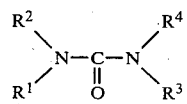

wherein $R^1$, $R^2$, $R^3$ and $R^4$ have the same definitions as specified above.

Examples of activators, corresponding to the above general formula (I), which are suitable for the purpose of the invention, include N-methyl, ethyl, propyl, hexyl and phenyl urea, N,N'-dimethyl, dibutyl and diphenylurea, N,N,N'-trimethylurea and N,N,N',N'-tetrabutylurea; also ureas obtained in known manner by the reaction of a primary or secondary aliphatic, cycloaliphatic or aromatic monoamines with monoisocyanates. The ureas may be preformed or produced "in situ" in the reaction mixture. Highly alkylated ureas such as trimethyl or tetramethylurea and arylureas such as diphenyl urea must be used in relatively large quantities (0.5 to 1.0%) due to their relatively low catalytic activity. At these concentrations, they accelerate the final solidification of the resulting ureas without noticeably affecting the pouring time of the reaction mixtures. However, the stability in storage of the isocyanate prepolymers may be impaired to some extent (see Example 7).

To prepare isocyanate-containing prepolymers (III), 1,5-naphthylene diisocyanate is reacted, in known manner, with a substantially linear polyhydroxyl compound having a molecular weight of from 500 to 6,000, preferably from 1,000 to 3,000. The NCO/OH equivalent ratio is generally from 1.2:1 to 5:1, preferably from 1.5:1 to 2.5:1.

The polyhydroxyl compounds used include polyesters, polyethers, polythioethers, polyacetals, polycarbonates and polyester amides containing two hydroxyl groups and optionally also minor quantities of compounds of this type containing three hydroxyl groups, such as those already known for the preparation of homogeneous polyurethanes.

Suitable polyesters with hydroxyl groups include, e.g. the reaction products of polyhydric, preferably dihydric alcohols, to which trihydric alcohols may be added, and polybasic, preferably dibasic carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or unsaturated.

The following are examples of such carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids which may be mixed with monomeric unsaturated fatty acids such as oleic acid, dimethyl terephthalate and terephthalic acid-bis-glycol esters. Suitable polyhydric alcohols include e.g. ethylene glycol, propylene glycol-(1,2) and -(1,3), butylene glycol-(1,4) and -(2,3), hexanediol-(1,6), octanediol-(1,8), neopentylglycol, 1,4-bis-hydroxymethylcyclohexane, 2-methyl-1,3-propanediol, glycerol, trimethylolpropane, hexanetriol-(1,2,6), butanetriol-(1,2,4), trimethylolethane, pentaerythritol, quinitol, mannitol and sorbitol, formitol, methylglycoside, diethyleneglycol, triethyleneglycol and higher polyethylene glycols, dipropyleneglycol and higher polypropylene glycols; and dibutyleneglycol and higher polybutylene glycols. The polyesters may contain a proportion of carboxyl end groups. Polyesters of lactones such as ε-caprolactone or of hydroxy carboxylic acids such as ω-hydroxycaproic acid may also be used. Polyesters are preferred according to the invention, in particular adipic acid polyesters having a molecular weight of from 1,000 to 3,000.

The polyethers with hydroxyl groups which may be used according to the invention are also known and may be prepared for example, by the polymerization of epoxides such as ethylene oxide, propylene oxide, butylene oxide, tetrahydrofuran, styrene oxide or epichlorohydrin, either on their own, e.g. in the presence of Lewis catalysts such as boron trifluoride, or by chemical addition of these epoxides, preferably ethylene oxide and propylene oxide, either as mixtures or successively, to starting components containing reactive hydrogen atoms, such as water, alcohols, ammonia or amines. Suitable starters include ethyleneglycol, propyleneglycol-(1,3) or -(1,2), 4,4'-dihydroxydiphenyl-propane, aniline, ethanolamine or ethylene diamine. It is frequently preferred to use polyethers which contain predominant (up to 90% by weight, based on all the hydroxyl groups in the polyether) amounts of primary hydroxyl groups. Polybutadienes containing hydroxyl groups are also suitable according to the invention.

Among the polythioethers should be particularly mentioned the condensation products obtained by the reaction of thiodiglycol on its own and/or with glycols, dicarboxylic acids, formaldehyde, aminocarboxylic acids or aminoalcohols. The products obtained may be e.g. polythio mixed ethers, polythio ether esters or polythioether ester amides, depending on the co-components.

Suitable polyacetals include e.g. the compounds prepared from glycols such as diethylene glycol, triethyleneglycol, 4,4'-dioxethoxydiphenyldimethylmethane, hexanediol and formaldehyde. Polyacetals suitable for the purpose of the invention may also be prepared by the polymerization of cyclic acetals such as trioxane (German Offenlegungsschrift No. 1,694,128).

Suitable polycarbonates with hydroxyl groups are known, e.g. those obtained by the reaction of diols such as propanediol-(1,3), butanediol-(1,4) and/or hexanediol-(1,6), diethylene glycol, triethylene glycol, tetraethylene glycol or thiodiglycol with diarylcarbonates, such as diphenylcarbonate or phosgene (German Auslegeschriften Nos. 1,694,080; 1,915,908 and 2,221,751 and German Offenlegungsschrift No. 2,605,024).

Suitable polyester amides and polyamides include e.g. the predominantly linear condensates obtained from polybasic saturated or unsaturated carboxylic acids or their anhydrides and polyvalent saturated or unsaturated amino alcohols, diamines, polyamines or mixtures thereof.

The polyhydroxyl compounds mentioned may be modified in various ways before they are used in the polyisocyanate polyaddition process. According to German Offenlegungsschriften No. 2,210,839 (U.S. Pat. No. 3,849,515) and No. 2,544,195, for example, a mixture of various polyhydroxyl compounds (e.g. a polyether polyol and polyester polyol) may be condensed by etherification in the presence of a strong acid to form a relatively high molecular weight polyol built up of various segments joined by ether bridges.

Polyhydroxyl compounds containing high molecular polyadducts or polycondensates or polymers in a finely dispersed or dissolved form may also be used according to the invention. Polyhydroxyl compounds of this type may be obtained, e.g. by carrying out polyaddition reactions (e.g. reactions between polyisocyanates and aminofunctional compounds) or polycondensation reactions (e.g. between formaldehyde and phenols and/or amines) in situ in the above-mentioned hydroxyl compounds. Processes of this kind have been described, for example in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. Alternatively, such polyhydroxyl compounds may be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

Polyhydroxyl compounds modified with vinyl polymers as obtained, e.g. by the polymerization of styrene and acrylonitrile in the presence of polyethers (U.S. Pat. Nos. 3,383,351; 3,304,273; 3,523,093 and 3,110,695 and German Auslegeschrift 1,152,536) or polycarbonate polyols (German Pat. No. 1,769,795 and U.S. Pat. No. 3,637,909) are also suitable for the process according to the invention. When using polyether polyols which have been modified in accordance with German Offenlegungsschriften Nos. 2,442,101; 2,644,922 and 2,646,141 by graft polymerization with vinyl phosphonic acid esters and optionally (meth)acrylonitrile, (meth)acrylamide or OH functional (meth)acrylic acid esters, the synthetic resins obtained as end products have exceptionally high flame resistance.

When modified polyhydroxyl compounds of the type mentioned above are used as starting components for the polyisocyanate polyaddition process, the polyurethane resins obtained as end products, in many cases, have substantially improved mechanical properties.

Representatives of the above-mentioned compounds to be used according to the invention are known and have been described, e.g. in High Polymers, Vol. XVI, "Polyurethanes, Chemistry and Technology" by Saunders-Frisch, Interscience Publishers, New York, London, and Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich 1966, pages 45–71. Mixtures of the above-mentioned compounds may, of course, also be used, e.g. mixtures of polyethers and polyesters.

It is particularly advantageous in some of these cases to use a combination of low melting and high melting polyhydroxyl compounds (German Offenlegungsschrift No. 2,706,297).

Polyester diols are preferred among the relatively high molecular weight polyhydroxyl compounds used according to the invention, particularly those based on adipic acid or ethylene glycol, 1,2-propylene glycol, 1,4-butanediol, neopentylglycol and/or 1,6-hexanediol. The polyester diols should preferably be freed from any traces of moisture present before they are reacted with naphthylene diisocyanate. This may be carried out, e.g. by heating the polyester diols to temperatures of from 100° to 150° C. in a vacuum or by passing inert gases through the solvent-free molten polyester at elevated temperatures.

The reaction of the isocyanate prepolymer based on 1,5-naphthylene diisocyanate with the chain lengthening agent is preferably carried out with a slight excess of isocyanate groups. The equivalent ratio of isocyanate groups to Zerewitinoff active hydrogen atoms used is generally in the range of from 1.02 to 1.20, although the chain lengthening agent may be used in an approximately equivalent proportion to the isocyanate groups present so that a substantially linear polyurethane molecule is initially formed. In that case, about 1 to 5% by weight of any polyisocyanate are subsequently incorporated as crosslinking agent in this linear polyurethane before the shaping process.

Other compounds apart from water may be used as chain lengthening agents according to the invention, in particular glycols having a molecular weight of from 62 to 500. The following are examples of such compounds: ethylene glycol, propylene glycol-(1,2) and -(1,3), butanediol-(1,4) and -(2,3), pentanediol-(1,5), hexanediol-(1,6), octanediol-(1,8), neopentylglycol, 1,4-bis-hydroxymethyl-cyclohexane, 2-methyl-1,3-propanediol, butanediol, butynediol, monochlorohydrin, glycerolmonoalkyl or monoarylethers, xylylene glycols, the Diels-Alder addition product of butenediol and anthracene, quinitol, hexahydropyrocatechol, 4,4'-dihydroxydiphenylpropane, dihydroxymethyl-hydroquinone, hydroquinone bis-hydroxyethyl ether, diethyleneglycol, triethyleneglycol, tetraethyleneglycol, higher polyethylene glycols having a molecular weight of up to 500, dipropyleneglycol, higher polypropylene glycols having a molecular weight of up to 500, dibutyleneglycol, higher polybutylene glycols having a molecular weight of up to 500 and N-methyl-diethanolamine. 1,4-and 2,3-butanediol, cyclic glycols such as hexahydropyrocatechol and hydroquinone-bis-hydroxyethylether and thiodiglycol are particularly suitable.

The relatively high molecular weight dihydroxy compounds described in detail above are also suitable for use as chain lengthening agents, particularly for preparing very soft end products. In such cases, it is frequently advantageous to use a different dihydroxy compound for the chain lengthening reaction from that used for synthesizing the isocyanate prepolymer (e.g. a polyester and a polyether). When water is used as chain lengthening agent, the formation of a foam should be avoided. This can be achieved in known manner by molding the product under pressure.

If desired, known plasticizers, dyes and fillers may be added at any stage of the process according to the invention. Suitable plasticizers include, for example, phthalic acid esters and organic sulphonamides. Plasticizers containing sulphur are in many cases particularly suitable, e.g. methylene-bis-thioglycollic acid butyl ester. As in the case of natural rubber, some fillers improve the mechanical properties of the polyurethane elastomers produced according to the invention. Such examples include titanium dioxide, silicon dioxide, bentonite, calcium silicate and carbon black. These fillers may, for example, be incorporated directly in the relatively high molecular weight polyhydroxyl compound or they may be incorporated in the isocyanate prepolymer.

The polyurethane elastomers used according to the invention have excellent mechanical properties and excellent resistance to organic solvents and oils. These properties mean that the elastomers produced according to the invention are suitable for a wide field of application, for example, as linings for rollers, elastic structural parts for machines, seals, buffers, bellows, linings for ball mills, shoe soles, gear wheels and motor vehicle tires.

The examples which follow serve to explain, but in no way limit the present invention. The quantities given are to be understood as parts by weight or percentages by weight unless otherwise indicated.

EXAMPLES

EXAMPLE 1

(Comparison Experiment)

90 g of 1,5-naphthylene diisocyanate are stirred at 126° C. into 500 g of a polyester of ethyleneglycol and adipic acid which has hydroxyl end groups and a hydroxyl number of 56. The temperature of the reaction mixture ceases to rise after about 15 minutes, i.e. the reaction is virtually terminated. 10 g of butanediol-(1,4) are added to the highly fluid melt and the reaction mixture is poured into waxed molds which are heated to 100° C. The pouring time is 5 minutes and the mold release time about 30 minutes.

EXAMPLE 2

(Comparison Experiment)

When a solution of 0.2 g of diaza bicyclooctane in 10 g of butanediol-(1,4) is used instead of butanediol-(1,4) alone, the viscosity of the highly fluid melt rises rapidly and the pouring time of the reaction mixture is only about one minute. The mold release time of the test sample is now 3-4 minutes. The mechanical properties of the synthetic resin produced in this way are markedly inferior to those obtained in Example 1 and 3, in particlar the tensile strength, tear propagation resistance and elasticity.

EXAMPLE 3

When a solution of 0.3 g of N-methylurea in 10 g of butanediol-(1,4) is used to crosslink the polyester containing 1,5-naphthylene diisocyanate of Example 1, the melt remains in a workable state until the end of the pouring time (approximately 4 minutes) and the sample can be removed from its mold after only 9-10 minutes.

| Mechanical properties and processing times of Examples 1-3 | | | |
|---|---|---|---|
| | Example 1 | Example 2 | Example 3 |
| Pouring time [min.] | 5 | 1-2 | 4 |
| Mold release time [min.] | 30 | 4 | 9-10 |
| Shore hardness A (DIN 53505) | 83 | 80 | 83 |
| Tensile strength (DIN 53504) [kp/cm$^2$] | 612 | 270 | 616 |
| Elongation at break (DIN 53504) [%] | 750 | 780 | 710 |
| Tear propagation resistance [kp/cm] (DIN 53515) (Graves) | 56 | 35 | 58 |

-continued

| Mechanical properties and processing times of Examples 1-3 | | | |
|---|---|---|---|
| | Example 1 | Example 2 | Example 3 |
| Elasticity [%] | 50 | 35 | 49 |

EXAMPLE 4

(Comparison Experiment)

The addition of a solution of 0.08 g of tin(II) ethyl hexoate in 10 g of butanediol-(1,4) to the isocyanate prepolymer of Example 1 causes a very pronounced increase in viscosity shortly after the solution has been stirred in, making satisfactory processing of the reaction mixture no longer possible.

EXAMPLE 5

500 g of a polyester of adipic acid and ethylene glycol containing hydroxyl end groups and having a hydroxyl number of approximately 56 are heated to 126° C. and 0.25 g of N-methylurea is added. 90 g of 1,5-naphthylene diisocyanate are then stirred in. The reaction to the isocyanate prepolymer is completed after 6 minutes (instead of 15 minutes without N-methylurea in Example 1), i.e. there is no further rise in temperature. After 10 g of butanediol-(1,4) have been stirred in, the reaction mixture can be poured into waxed molds. The viscosity of the reaction mixture is exactly as low and the pouring time approximately as long (4 minutes) as without the addition of N-methylurea. When activator is added, the molded product can be removed from its mold after only about 10 minutes. Without the addition of N-methylurea, solidification takes approximately 30 minutes.

EXAMPLE 6

A production batch of a polyester of adipic acid and ethyleneglycol is found to be too slow to react when tested, i.e. the temperature rise in the reaction with 1,5-naphthylene diisocyanate takes approximately 15 minutes to be completed and a material which has been crosslinked with butanediol-(1,4) does not solidify until after approximately 45 minutes. This batch was then mixed with 0.06% of N-methylurea. The reaction with 1,5-naphthylene diisocyanate proceeded much more rapidly, i.e. the reaction is completed after approximately 7 minutes and a standard test sample, cast after it had been mixed with butanediol-(1,4), can be removed from its mold after approximately 12 minutes.

EXAMPLE 7

180 g of 1,5-naphthylene diisocyanate are added, with stirring, to a solution of 0.5 g of N-methylurea in 1,000 g of a polyester of ethyleneglycol and adipic acid, hydroxyl number 56, thermostatically heated to 126° C. The reaction temperature initially falls to 115° C. and then rises. The maximum temperature of 125°-126° C. (termination of the reaction) is reached after 8-9 minutes. To compare the catalytic activity of multiple methyl substituted ureas, the above method was used to determine the quantity of catalyst required to produce the temperature rise from 116° C. to 126° C. within the same period of time (8-9 minutes).

| Alkyl urea | Quantity (g/1,000 g of polyester) | [m Mol] |
|---|---|---|
| N-methylurea | 0.5 | approx. 7 |
| N,N'-dimethylurea | 1.0 | 11 |
| Trimethylurea | 4.0 | 39 |
| Tetramethylurea | 6.0 | 52 |

When these prepolymers containing 1,5-naphthylene diisocyanate are crosslinked with butanediol-(1,4) in known manner, the pouring times (approximately 4 minutes) and solidification times (8-10 minutes) are virtually identical in all of the catalyzed systems but deviations in the viscosity of these prepolymers are found to occur under conditions of prolonged storage in a container thermostatically controlled at 110° C. When the time taken to reach a predetermined viscosity is recorded as a measure of allophanatization or trimerization, the following results are obtained:

| | Time (hours) |
|---|---|
| Isocyanate Prepolymers without catalyst | 16 |
| Isocyanate Prepolymers with N-methylurea | 16 |
| Isocyanate Prepolymers with N,N'-dimethylurea | 12 |
| Isocyanate Prepolymers with trimethylurea | 10 |
| Isocyanate Prepolymers with tetramethylurea | 8 |

EXAMPLE 8

150 g of 1,5-naphthylene diisocyanate are stirred into 500 g of dehydrated linear polypropylene glycol ether, with a molecular weight of 2,000, at 125° C. After termination of the reaction to the isocyanate prepolymer (ca. about 10 minutes), a solution of 0.3 g of N,N'-dimethylurea in 35 g of butanediol-(1,4) is added and the reaction mixture is poured into molds heated to 100° C. Having a pouring time of approximately one minute, the molded product can be removed from the mold after approximately 6-8 minutes. A highly elastic synthetic resin with excellent mechanical properties is obtained.

EXAMPLE 9

(Comparison Experiment)

When 1,5-naphthylene diisocyanate is replaced by the equivalent quantity of 4,4'-diisocyanatodiphenylmethane in Example 3, substantially softer products are obtained. Equally hard products are obtained only if the proportion of 4,4'-diisocyanatodiphenylmethane and butanediol-(1,4) is increased. 0.6 g of N-methylurea is dissolved in 1,000 g of a polyester of ethylene glycol and adipic acid, having a molecular weight of 2,000, and 400 g of 4,4'-diisocyanatodiphenylmethane are then stirred in at 100° to 110° C. When the exothermic reaction has died down, approximately 10-12 minutes, 85 g of butanediol-(1,4) are added and the reaction mixture is poured into molds heated to 110° C. After a pouring time of only 1.5 to 2 minutes, approximately 25 minutes must elapse before the standard molded product can be removed. Hardness (Shore A)=83.

A smooth pouring operation cannot be ensured due to the short pouring time of the reaction mixture, and the long operating cycle of approximately 25 minutes is uneconomical for practical conditions.

What is claimed is:

1. In a process for the production of polyurethane elastomers by the reaction of 1,5-naphthylene diisocyanate with a substantially linear, relatively high molecular weight polyhydroxyl compound to produce a prepolymer containing isocyanate groups, followed by a reaction with a chain lengthening agent in the presence of an activator, the improvement wherein the activator used is a compound corresponding to the general formula:

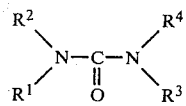

wherein $R^1$ represents an alkyl, cycloalkyl, aralkyl or aryl group with 1 to 15 carbon atoms which may be substituted by a urea group corresponding to the general formula:

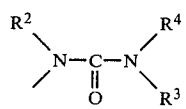

wherein $R^2$, $R^3$ and $R^4$ represent hydrogen, phenyl groups or straight or branched chain alkyl groups having 1 to 6 carbon atoms, and wherein the operating conditions employed are such that substantially homogeneous elastomers are obtained.

2. A process according to claim 1, wherein the relatively high molecular weight polyhydroxyl compound used is a polyester diol having a molecular weight of from 1,000 to 3,000.

3. A process according to claim 1, characterized in that the chain lengthening agent used is 1,4-butanediol, 2,3-butanediol or thiodiglycol.

4. A process according to claim 1, wherein the activator is used in a quantity of from 0.01 to 0.5% by weight, based on the sum of the naphthylene diisocyanate and the relatively high molecular weight polyhydroxyl compound.

5. A process according to claim 1, wherein the activator used is N-methylurea or N,N'-dimethylurea.

6. Activated prepolymers with isocyanate end groups which are stable in storage consisting of (a) compounds corresponding to the general formula:

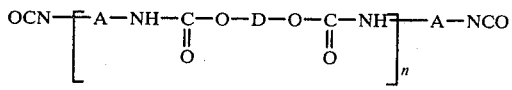

wherein a represents a group corresponding to the formula:

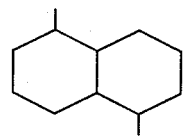

D represents a divalent group such as is obtained by removal of the hydroxyl groups from a glycol having a molecular weight of from 500 to 6,000 and n represents an integer of from 1 to 5, (b) from 0.001 to 1% by weight, based on (a)+(b), of a compound corresponding to the general formula:

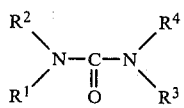

wherein $R^1$ represents an alkyl, cycloalkyl, aralkyl or aryl group with 1 to 15 carbon atoms which may be substituted by a urea group corresponding to the general formula

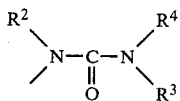

wherein $R^2$, $R^3$ and $R^4$ represent hydrogen, phenyl groups or straight or branched chain alkyl groups having 1 to 6 carbon atoms; and (c) a monomeric 1,5-naphthylene diisocyanate.

7. Prepolymers according to claim 6, wherein D denotes a divalent group as obtained by the removal of the hydroxyl group from a polyester diol having a molecular weight of from 1,000 to 3,000.

8. Prepolymers according to claim 6, wherein n represents the number 1 or 2.

* * * * *